(No Model.)
J. C. BAYLES.
APPARATUS FOR WELDING.
No. 441,277. Patented Nov. 25, 1890.
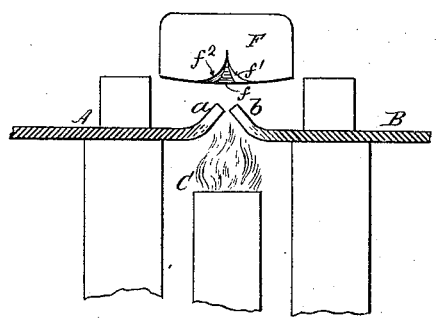
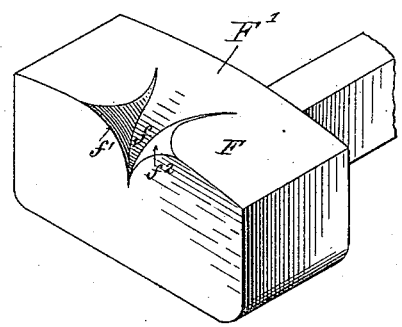
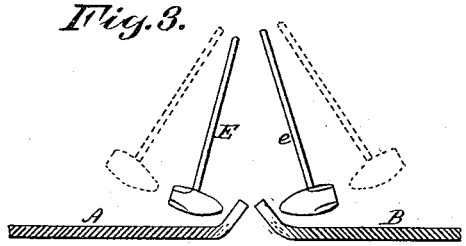
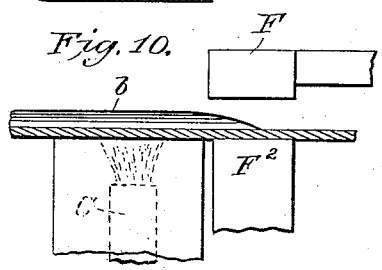
Witnesses:
M. L. Adams
J. E. Burns
Inventor:
James C. Bayles,
Per Edw. E. Quimby
Atty.

UNITED STATES PATENT OFFICE.

JAMES C. BAYLES, OF EAST ORANGE, NEW JERSEY.

APPARATUS FOR WELDING.

SPECIFICATION forming part of Letters Patent No. 441,277, dated November 25, 1890.

Application filed October 1, 1890. Serial No. 366,714. (No model.)

*To all whom it may concern:*

Be it known that I, JAMES C. BAYLES, of East Orange, New Jersey, have invented an Improvement in the Art of Welding Together the Meeting Edges of Iron or Steel Sheets or Plates, of which the following is a specification.

The object of this invention is to facilitate the practice of the art of welding the joints of iron or steel sheets or plates described in pending application, Serial No. 342,911, filed March 6, 1890, and therein designated "clinal welding."

Iron or steel sheets or plates are prepared for clinal welding by having those of their edges which are to be united provided with diagonal bends. The sheets or plates are then arranged with their diagonal bends occupying convergent positions in close proximity to each other and in suitable relation to a furnace or hot blast, by which the bends are raised to a welding heat preparatory to being appropriately supported upon an anvil and welded together by hammering or compression.

The preferred method of welding consists in first applying force to the heated bends in such manner as to drive them laterally toward and against each other, whereby they are made to unite and form a welded ridge of metal, and in then applying force in such direction as to flatten such ridge toward or into the plane of the sheets.

The preferred apparatus for carrying out the described method of welding consists of any suitable anvil for supporting the work and a hammer or die, the face of which at the end adjacent to the furnace or source of heat is provided with a notch or recess having convergent side walls and gradually diminishing in depth and increasing in width. The mouth of the notch is wide enough at the edge of the hammer next the furnace to straddle the two bends, and the resultant effect of the first blows of the hammer thereon is to crowd the bends against each other as they are subjected to progressive compression between the convergent side walls of the notch. The hammer and anvil are then moved along the work, or the work is fed between the hammer and anvil, the blows of the hammer or die being repeated until the ridge produced by the welding together of the bends is flattened down substantially into the plane of the sheets by the continued blows of the flat portion of the face of the die or hammer adjacent to the notched portion.

The accompanying drawings, illustrating the apparatus employed, are as follows:

Figure 1 is a symbolic representation of a furnace and a transverse section of two plates with the required bends arranged in suitable proximity to each other and to the furnace, together with a front elevation of the notched end of a hammer, the furnace being assumed to be in front elevation and the hammer as vibrating in a vertical plane in the rear of the furnace. Fig. 2 is an isometrical perspective of the hammer or die, exhibiting the notched face. Fig. 3 is a symbolic representation of a pair of hammers vibrating in different parts of the same plane for effecting the preliminary union of the heated bends, and thereby carrying out the first step of the present process. Figs. 4, 5, 6, 7, 8, and 9 are transverse sections symbolically representing, respectively, the original shapes and positions of the bends as prepared for welding and the progressive changes in the form of the weld produced by successive impacts with the notched and flat portions of the face of the hammer as the work is fed along the surface of the anvil which supports it. Fig. 10 is a symbolic representation of the hammer and anvil in side elevation, illustrating the gradual forging down of the weld into the plane of the sheets.

The drawings represent in cross-section two iron or steel plates A B, which are prepared for being united by a welded joint by having their adjacent edges provided, respectively, with the diagonal bends *a b*. The sheets thus prepared are clamped in suitable proximity to each other and in proper relation to the furnace or source of heat, as symbolically illustrated in Fig. 1. The flame or hot blast C is directed into and through the space between the bends, which are thus brought to a welding heat.

The first step in the process of welding is to apply the necessary lateral force to drive the two bends toward and against each other, whereby they become welded into the form of the ridge D, symbolically represented in Fig. 5. This preliminary step of the welding process may be performed by means of the hammers E e, adapted to vibrate rapidly in different parts of the same plane, as symbolically represented in Fig. 3; but it will usually be more convenient to adopt the simpler device illustrated in Fig. 2, which consists of a hammer block or die F, adapted to deliver its blows in a direction substantially perpendicular to the plane of the sheets and having a portion F' of its working-face flat and the adjoining portion of its face toward the furnace provided with a notch $f$, the mouth of which, at the end of the hammer block or die which is fed toward the work, or toward which the work is fed, is large enough to straddle the two bends, so that the flaring side walls $f'$ $f^2$ of the mouth will force the two bends toward and against each other as the hammer delivers its blows toward the face of the anvil $F^2$, upon which the work is supported. By whichever method the preliminary step of the welding operation be performed the result is the formation of the welded ridge D, and the next step consists in flattening this ridge toward the plane of the sheets, which is effected by the successive blows of a flat-faced hammer delivering its blows in a direction substantially perpendicular to the plane of the sheets, and which may either be a separate hammer, employed in conjunction with the vibrating hammers E e or in conjunction with a notched straddling-hammer, or may be a hammer having a portion of the working-face flat and the remaining portion notched, as illustrated in Fig. 2. In either case as the work progresses the welded ridge is flattened down, as illustrated in Figs. 6, 7, and 8, until, if desired, all appearance of a ridge is obliterated, as illustrated in Fig. 9, in which case the only remaining indication of the weld will be the shallow groove $d$, having convex side walls meeting each other at a sharp angle, which is one of the characteristic marks of the so-called "clinal weld."

Welding apparatus embracing, essentially, a furnace, an anvil, and a vibrating hammer being well known and in common use need not be herein described. In such apparatus the work is sometimes fed from a stationary furnace over a stationary anvil, toward the face of which the hammer moves in delivering its blows, or the work may be maintained in a stationary position and the furnace, anvil, and hammer be moved progressively along the line of the weld. It is therefore deemed sufficient to herein describe in detail merely a hammer block or die having the notched face, which is the characteristic feature of the apparatus claimed.

What is claimed as the invention is—

1. In an apparatus for welding together iron or steel sheets or plates, a hammer block or die having a portion F' of its working-face flat and the remaining portion provided with a notch or recess $f$, having convergent side walls $f'$ and $f^2$, as and for the purposes set forth.

2. The combination, as herein set forth, of a furnace, an anvil adapted to support two iron or steel sheets or plates provided upon their adjoining edges with diagonal bends, and a hammer provided upon its working-face with a notch having convergent side walls and adapted to reciprocate in a path substantially perpendicular to the face of the said anvil, as and for the purpose described.

JAMES C. BAYLES.

Witnesses:
WM. S. CHURCH,
GEO. ROSS GREEN.